(12) United States Patent
Yamakawa

(10) Patent No.: US 10,134,344 B2
(45) Date of Patent: Nov. 20, 2018

(54) LIQUID CRYSTAL APPARATUS AND TELEVISION RECEIVER

(71) Applicant: Sakai Display Products Corporation, Sakai-shi, Osaka (JP)

(72) Inventor: Ryo Yamakawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/319,529

(22) PCT Filed: Sep. 12, 2014

(86) PCT No.: PCT/JP2014/074279
§ 371 (c)(1),
(2) Date: Dec. 16, 2016

(87) PCT Pub. No.: WO2016/038739
PCT Pub. Date: Mar. 17, 2016

(65) Prior Publication Data
US 2017/0323603 A1    Nov. 9, 2017

(51) Int. Cl.
*G09G 3/34* (2006.01)
*G09G 3/36* (2006.01)
(Continued)

(52) U.S. Cl.
CPC ......... *G09G 3/3607* (2013.01); *G09G 3/3406* (2013.01); *G09G 3/3648* (2013.01);
(Continued)

(58) Field of Classification Search
CPC .... G09G 3/3607; G09G 3/342–3/3426; G09G 2320/0271–2320/0276
(Continued)

(56) References Cited

U.S. PATENT DOCUMENTS 7,755,594 B2 *   7/2010   Yoshihara ............ G09G 3/3413
                                                          345/100
8,144,141 B2 *   3/2012   Hirose ................. G09G 3/3426
                                                          345/209
(Continued)

FOREIGN PATENT DOCUMENTS

JP          H10-274783 A       10/1998
JP          2002-99250 A        4/2002
(Continued)

*Primary Examiner* — Michael Pervan
(74) *Attorney, Agent, or Firm* — Rudy J. Ng; Bret E. Field; Bozicevic, Field & Francis LLP

(57) ABSTRACT

A liquid crystal television increases or decreases a gradation value when the gradation value of an image signal to be displayed on a liquid crystal panel is within a prescribed range. Further, the liquid crystal television decreases or increases the luminance depending to the gradation value of the image signal based on the increase or decrease in the gradation value. The liquid crystal television applies a voltage depending on the gradation value after the change to the liquid crystal panel, such that a transmittance in the liquid crystal panel is changed (increased or decreased). Further, the liquid crystal television controls each light source to emit light with the luminance after the change, such that the luminance of the light radiated to the liquid crystal panel from the light source is changed (decreased or increased).

10 Claims, 6 Drawing Sheets

(51) Int. Cl.
*H04N 3/12* (2006.01)
*H04N 5/74* (2006.01)

(52) U.S. Cl.
CPC ........... *H04N 3/127* (2013.01); *H04N 5/7441* (2013.01); *G09G 2300/0443* (2013.01); *G09G 2310/0205* (2013.01); *G09G 2320/0271* (2013.01); *G09G 2320/0653* (2013.01); *G09G 2360/16* (2013.01); *G09G 2370/08* (2013.01)

(58) Field of Classification Search
USPC ................ 345/102; 362/97.1–97.4, 600–634
See application file for complete search history.

(56) References Cited

U.S. PATENT DOCUMENTS

2013/0335682 A1* 12/2013 Gilbert .................. G09G 3/003
    349/85
2014/0160181 A1    6/2014 Takeda et al.

FOREIGN PATENT DOCUMENTS

JP    2004-258139 A    9/2004
JP    2013-50703 A    3/2013

* cited by examiner

LIQUID CRYSTAL APPARATUS AND TELEVISION RECEIVER

CROSS-REFERENCE TO RELATED APPLICATION

This application is the national phase under 35 U.S.C. § 371 of PCT International Application No. PCT/JP2014/074279 which has an International filing date of Sep. 12, 2014 and designated the United States of America.

BACKGROUND

1. Technical Field

The present invention relates to a liquid crystal display apparatus and a television receiver which include a liquid crystal panel and a backlight.

2. Description of Related Art

Recently, liquid crystal display apparatuses such as a liquid crystal display and liquid crystal television have been distributed. The liquid crystal display apparatus has a liquid crystal panel and a backlight which irradiates the liquid crystal panel with light from a back side (rear side of a display screen) thereof. The liquid crystal panel includes a plurality of liquid crystal elements (pixels) which are formed by sealing liquid crystal molecules between electrodes disposed to face each other, the plurality of liquid crystal elements being arranged in a two-dimensional matrix shape. The liquid crystal display apparatus controls a direction of the liquid crystal molecules by changing a voltage value applied to the liquid crystal molecules, and controls an amount of light (transmittance of light) from the backlight transmitting through the respective liquid crystal molecules. The liquid crystal display apparatus is adjusted so as to have appropriate display characteristics when viewing the display screen from a front direction, such that the display characteristics when viewing from an oblique direction are different from those when viewing from the front direction. In particular, when displaying a halftone image, since each liquid crystal molecule is inclined with respect to the display screen to a certain degree, there is a difference in the amount of light reaching a viewer due to the direction of each liquid crystal molecule and a visual angle direction (viewing angle) of the viewer. Thereby, for example, a phenomenon called as a white floating, in which the displayed image when viewing from the oblique direction is generally seen whitish as compared with the displayed image viewed from the front direction, occurs.

In order to suppress the white floating, Japanese Patent Laid-Open Publication No. 2004-258139 and Japanese Patent Laid-Open Publication No. H10-274783 propose to use a multi-driving method in which a plurality of pixels (liquid crystal molecules) are set to one quasi-pixel, and a voltage value applied to each liquid crystal molecule included in one quasi-pixel is varied. In the multi-driving method, the direction of each liquid crystal molecule is different from each other depending on the voltage value applied thereto, and luminance of one quasi-pixel is achieved by an average value of the luminance of each pixel depending on the directions of each liquid crystal molecule (transmittance of light in each liquid crystal molecule). In the multi-driving method, since the directions of liquid crystal molecules included in one quasi-pixel are different from each other, a decrease in display characteristics when viewing from the oblique direction is suppressed, and thereby suppressing white floating.

SUMMARY

When using the multi-driving method, different V-T characteristics (voltage-transmittance characteristics) are set for each pixel included in one quasi-pixel. FIG. 1 is a graph illustrating the V-T characteristic. The graph illustrated in FIG. 1 represents the V-T characteristics when viewing from the oblique direction, wherein a horizontal axis represents the voltage value applied to the liquid crystal molecules, and a vertical axis represents the transmittance of light in the liquid crystal molecules, respectively. In the graph illustrated in FIG. 1, solid lines represent the V-T characteristics in a pixel that are controlled with a high luminance (high transmittance) among the pixels included in one quasi-pixel, and broken lines represent V-T characteristics in a pixel that is controlled with a low luminance (low transmittance). Further, in each pixel, different V-T characteristics are set for each R (red), G (green) and B (blue).

FIG. 2 is a graph illustrating visual angle characteristics (tone curves), and illustrates the tone curves when viewing from the oblique direction in the liquid crystal panel having the V-T characteristics of FIG. 1. In the graph illustrated in FIG. 2, the horizontal axis represents a gradation value when viewing the displayed image from the front, and the vertical axis represents the luminance when viewing the displayed image from the oblique direction. As illustrated in FIG. 1, the V-T characteristic of the blue pixel is steeper than the V-T characteristics of the red pixel and the green pixel in terms of a rising state. Thereby, as illustrated in FIG. 2, a gradation value, in which the luminance of the blue pixel when viewing from the oblique direction is more reduced than the luminance of red pixel and the green pixel, occurs. In the gradation value such as the halftone, there is a problem that a yellowish color is viewed when viewing the displayed image from the oblique direction.

The present invention has been made with the aim of solving the above problems. It is an object of the present invention to provide a liquid crystal display apparatus and a television receiver which suppress a yellowish color from being viewed even when viewing a displayed image of halftone from an oblique direction.

A liquid crystal display apparatus according to one embodiment of the present invention, comprises: a liquid crystal panel; a plurality of light sources that irradiate the liquid crystal panel with light; a panel driving unit that applies a voltage depending on a gradation value of an image signal to be displayed to the liquid crystal panel; and a light source control unit that controls each light source so as to radiate light with luminance depending on a gradation value of an image signal to be displayed in a display region of the liquid crystal panel corresponding to an irradiation region of the light by each light source. The liquid crystal display apparatus further comprises: a gradation changing unit that changes the gradation value when the gradation value of the image signal is within a prescribed range; and a luminance changing unit that increases/decreases the luminance of the light source according to a decrease/increase of the gradation value by the gradation changing unit, wherein the panel driving unit applies a voltage depending on the gradation value changed by the gradation changing unit to the liquid crystal panel, and the light source control unit controls the light source so as to radiate light with the luminance changed by the luminance changing unit.

According to the embodiment of the present invention, the transmittance of the liquid crystal panel (liquid crystal molecules), which is to be controlled by applying the voltage depending on the gradation value within the prescribed range, is controlled so as to be the transmittance depending on the gradation value other than the prescribed range. Thereby, when viewing from an oblique direction, a gradation value within a prescribed range, in which the luminance of a blue pixel is lower than the luminance of a red pixel and a green pixel, is not represented by the liquid crystal panel, thereby suppressing a yellowish color from being viewed when viewing the displayed image from the oblique direction. Further, by increasing/decreasing the luminance of the light source according to a decrease/increase of the gradation value, it is possible to represent the gradation value within the prescribed range.

In the liquid crystal display apparatus according to the embodiment of the present invention, it is preferred that the gradation changing unit changes the gradation value of the image signal to be displayed for each display region of the liquid crystal panel, and the luminance changing unit changes the luminance of the light source for each irradiation region.

According to the embodiment of the present invention, in a configuration that can execute local dimming control to control the luminance for each irradiation region by each light source, the gradation value of the image signal to be displayed is changed for each display region of the liquid crystal panel corresponding to each irradiation region, and the luminance in each irradiation region is changed depending on the change of the gradation value. Thereby, the luminance and the gradation value can be changed for each irradiation region and the display region, such that it is possible to perform fine control.

In the liquid crystal display apparatus according to the embodiment of the present invention, it is preferred that the gradation changing unit changes the gradation value of the image signal based on an amount of change depending on the gradation value, and the luminance changing unit changes the luminance of the light source based on the amount of change depending on the gradation value of the image signal.

According to the embodiment of the present invention, the amounts of change in the gradation value and the luminance are varied depending on the gradation value. Since a typical liquid crystal panel is configured so that a gamma value representing a relationship of output luminance with respect to input gradation becomes 2.2, by changing the amounts of change depending on the gradation value, it is possible to display an appropriate image by the gradation value and the luminance after the change.

In the liquid crystal display apparatus according to the embodiment of the present invention, it is preferred that the light source directly irradiates one surface of the liquid crystal panel with light, or irradiates the same with light through a diffusion plate.

According to the embodiment of the present invention, by using a direct type light source, it is easy to change the luminance of each light source depending on the change of the gradation value.

A television receiver according to one embodiment of the present invention comprises: the liquid crystal display apparatus; and a receiver that receives television broadcasts. In the television receiver, the liquid crystal display apparatus displays an image based on the television broadcasts received by the receiver.

According to the embodiment of the present invention, a television receiver which suppresses a yellowish color from being viewed when viewing the displayed image from the oblique direction can be achieved.

According to the embodiment of the present invention, it is possible to suppress a yellowish color from being viewed even when viewing the displayed image with a gradation value within a prescribed range from the oblique direction.

The above and further objects and features will more fully be apparent from the following detailed description with accompanying drawings.

DETAILED DESCRIPTION

Hereinafter, embodiments in which a liquid crystal display apparatus and a television receiver according to the present invention are applied to a liquid crystal television will be described in detail with reference to the drawings illustrating the embodiments thereof. The liquid crystal television of the present embodiment displays a color image based on a color image signal input from an outside. The color image signal may be an image signal from television broadcasts, an image signal read from a recording medium such as a digital versatile disc (DVD) or Blu-ray® Disc (BD), an image signal received via a network or the like.

Figure 1:
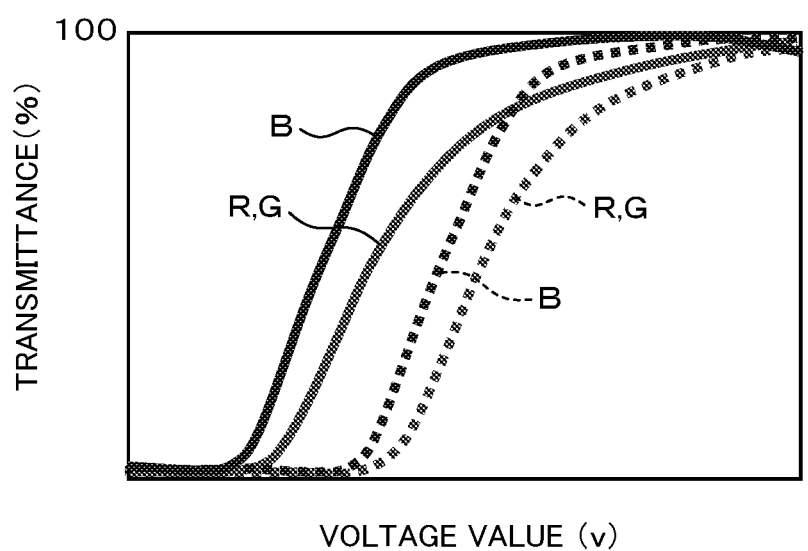
FIG. 1 is a graph illustrating the V-T characteristic.
Figure 2:
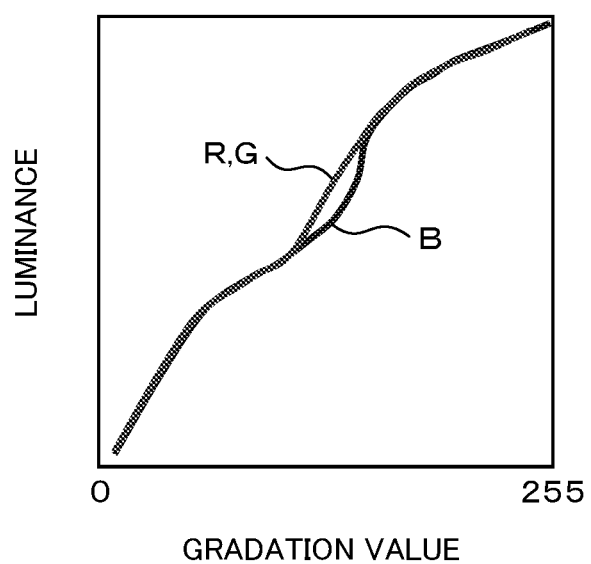
FIG. 2 is a graph illustrating visual angle characteristics.
Figure 3:
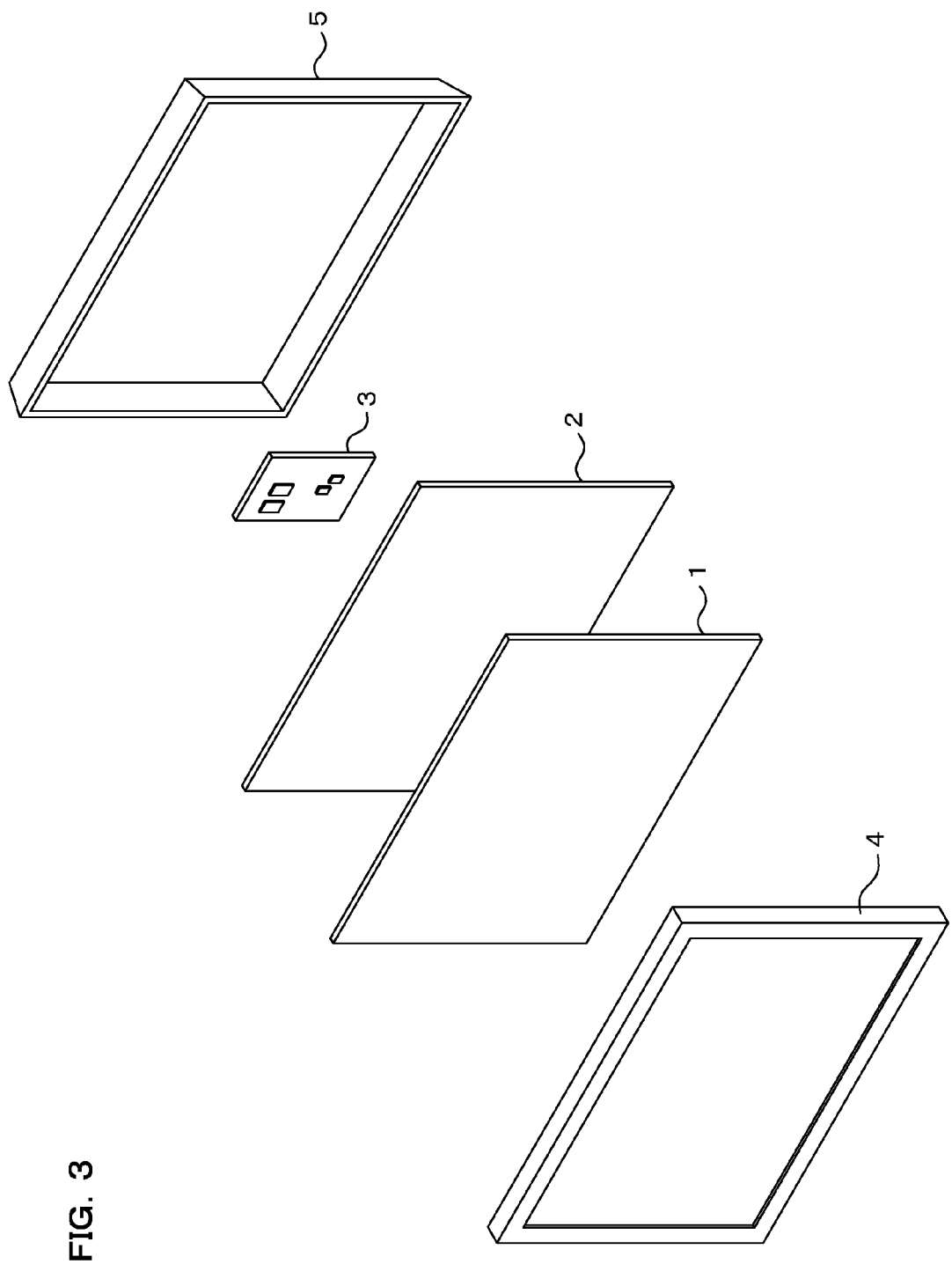
FIG. 3 is an exploded perspective view illustrating a configuration of main parts of the liquid crystal television of the present embodiment.

FIG. 3 is an exploded perspective view illustrating a configuration of main parts of the liquid crystal television of the present embodiment. The liquid crystal television according to the present embodiment includes a rectangular plate-shaped liquid crystal panel 1 having a display surface on one surface thereof, a backlight 2 which is provided on the other surface side of the liquid crystal panel 1 to irradiate the liquid crystal panel 1 with light and the like. In addition, the liquid crystal television of the present embodiment has a housing including a rectangular plate-shaped bezel 4 which holds peripheral edges of the liquid crystal panel 1 from the display surface side, and a rectangular dish-shaped backlight chassis 5 which holds the backlight 2 from a back side (rear side of a surface facing the liquid crystal panel 1). The liquid crystal television of the present embodiment includes a tuner (receiver) 3 at an appropriate location inside of the housing to receive a broadcast signal of television broadcasts. In the example illustrated in FIG. 3, the tuner 3 is provided on the back side of the backlight 2.

Figure 4:
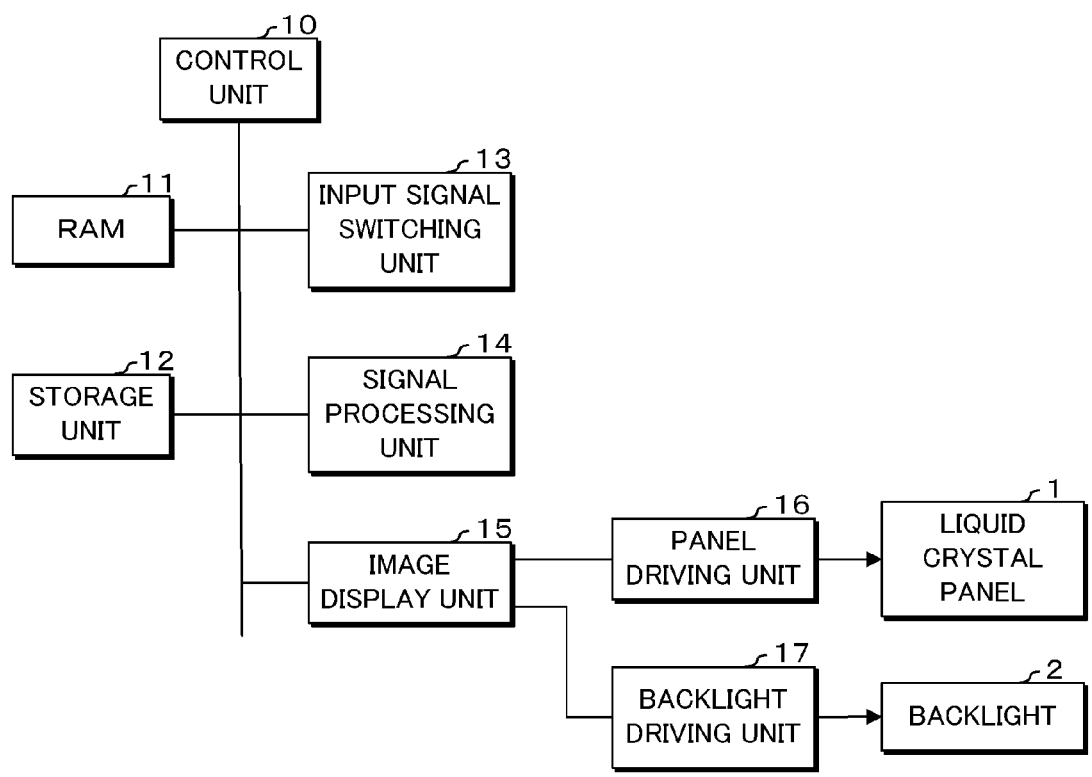
FIG. 4 is a block diagram illustrating an internal configuration of the liquid crystal television of the present embodiment.

FIG. 4 is a block diagram illustrating an internal configuration of the liquid crystal television of the present embodiment. The liquid crystal television of the present embodiment has a control unit 10, a random access memory (RAM)

11, a storage unit 12, an input signal switching unit 13, a signal processing unit 14, an image display unit 15 and the like.

The control unit 10 is a central processing unit (CPU), a micro processor unit (MPU) or the like. The control unit 10 appropriately reads a control program stored in the storage unit 12 to the RAM 11 and executes the same, and controls operations of the above-described each unit to operate the liquid crystal television as the liquid crystal display apparatus and the television receiver according to the present invention. The RAM 11 is a static RAM (SRAM), a dynamic RAM (DRAM), a flash memory, or the like, and temporarily stores data generated when executing various control programs by the control unit 10. The storage unit 12 is the flash memory, a hard disk drive (HDD), or the like, and previously stores the control program and various data executed by the control unit 10.

The input signal switching unit 13 has a plurality of input terminals, and one input terminal is connected to the tuner 3. In addition, other input terminals may be connected to external devices such as a BD recorder, a hard disk recorder, a digital still camera, a digital video camera, a game machine, a personal computer (PC), and a portable terminal. The input signal switching unit 13 selects any one of input terminals to which the tuner 3 and the external device are connected in accordance with an instruction from the control unit 10, and outputs an image signal input through the selected input terminal to the signal processing unit 14.

For example, the liquid crystal television of the present embodiment has the receiving unit (not illustrated) which receives a signal transmitted from a remote controller operated by a user, and the control unit 10 determines the input terminal to be selected based on the signal received by the receiving unit, and instructs the input signal switching unit 13 to switch to the determined input terminal.

The signal processing unit 14 executes various signal processings on the image signal acquired from the input signal switching unit 13, generates image data for displaying an image on the liquid crystal panel 1, and outputs the generated image data to the image display unit 15. The signal processing unit 14 executes, for example, processing of extracting the image signal for displaying an image for one frame from the image signal, and processing of generating data representing red, green and blue (RGB data) relating to the color image based on the image signal. The image data output from the signal processing unit 14 has, for example, image data for 30 frames per 1 second, and the image data of each frame is data (RGB data) in which gradation values of red, green and blue in each pixel included in the image of each frame are represented as numerical values of 0 to 255. In addition, the signal processing unit 14 may also have a configuration that executes signal processing such as digital conversion processing, color space conversion processing, scaling processing, color correction processing, synchronization detection processing, and gamma correction processing, as necessary.

The image display unit 15 is connected to a panel driving unit 16 for driving the liquid crystal panel 1, and a backlight driving unit 17 for controlling the turn on/off, and luminance of the backlight 2. The image display unit 15 controls the panel driving unit 16 and the backlight driving unit 17 based on the image data acquired from the signal processing unit 14 to display an image (video) such as a still image or a moving image on the liquid crystal panel 1. The panel driving unit 16 and the backlight driving unit 17 drive the liquid crystal panel 1 and the backlight 2 by using a power supplied from a power source (not illustrated).

The liquid crystal panel 1 is formed by sealing liquid crystal molecules between two rectangular-shaped glass substrates disposed to face each other through spacers. A color filter having three primary colors of red (R), green (G) and blue (B), and a common electrode are arranged on opposite surfaces of the glass substrate placed on the display surface side, respectively. A red color filter allows for only red light to be transmitted while blocking the other light, a green color filter allows for only green light to be transmitted while blocking the other light, and a blue color filter allows for only blue light to be transmitted while blocking the other light. Horizontal scanning lines and vertical signal lines are arranged in a matrix shape on opposite surfaces of the glass substrate placed on the rear side, respectively, and an active element for applying a voltage to the liquid crystal molecules, for example, a thin film transistor (TFT) and a pixel electrode are provided in an intersection portion of the scanning line and the signal line. A gate terminal of the TFT is connected to the scanning line, a source terminal of the TFT is connected to the signal line, and a drain terminal of the TFT is connected to the pixel electrode. Further, polarizing films are respectively disposed on outer surfaces of each glass substrate so as to allow for the light of the backlight 2 to be transmitted while the TFT is turned off.

The panel driving unit 16 includes a scanning line driving circuit connected to the scanning lines of the liquid crystal panel 1, and a signal line driving circuit connected to the signal lines. The scanning line driving circuit includes, for example, a shift register circuit, and sequentially applies a prescribed voltage to each scan line for bringing the TFT to be turned on. The signal line driving circuit includes, for example, a shift register circuit and a sample hold circuit, and applies a voltage depending on the gradation value of the image to be displayed to each signal line. Specifically, the signal line drive circuit applies voltages depending on the gradation values (RGB data) of red, green and blue in each pixel included in images to be displayed to each signal line. Each TFT is turned on when a prescribed voltage is applied to the gate terminal by the scanning line driving circuit, and when the TFT is turned on, the voltage applied to the source terminal by the signal line driving circuit is applied to the pixel electrode. Therefore, a voltage depending on the gradation value is applied to each pixel electrode of the intersection portion of the scanning line and the signal line. In addition, the panel driving unit 16 applies a prescribed voltage to the common electrode.

By a difference between the voltage applied to each pixel electrode and the voltage applied to the common electrode (potential difference between the pixel electrode and the common electrode) and optical characteristics (V-T characteristics) of the liquid crystal molecules, a transmission amount (transmittance) of light transmitting through each liquid crystal molecule among the light radiated from the backlight 2 is determined. For example, the liquid crystal panel 1 is configured in such a manner that, when the potential difference between the pixel electrode and the common electrode is zero (0), the transmission amount (transmittance) of light in the liquid crystal molecules becomes zero (0). Thereby, the voltage depending on the gradation values of red, green and blue in each pixel is applied to each pixel electrode, such that the light of the transmission amount depending on each gradation value is transmitted through each liquid crystal molecule. The light transmitted through each liquid crystal molecule is transmitted through the respective color filters of red, green and blue facing to each liquid crystal molecule, and the light of three colors transmitted through each color filter is viewed as a full-color image by the viewer by a principle of additive color mixing.

By applying a prescribed voltage to one scanning line by the scanning line driving circuit, the panel driving unit 16 causes the TFTs arranged in a horizontal direction to be simultaneously turned on, and in the meantime, applies the voltage depending on the gradation values of red, green and blue for one line in the horizontal direction by the signal line driving circuit to each signal line. By sequentially repeating the processing in the vertical direction, the panel driving unit 16 applies a voltage depending on the gradation values of red, green and blue in each pixel included in the images to be displayed to the pixel electrodes corresponding to all the pixels of the liquid crystal panel 1. According to each voltage applied to each pixel electrode of the liquid crystal panel 1, the transmittance in each liquid crystal molecule is controlled, and the light radiated from the backlight 2 is transmitted through each liquid crystal molecule and each color filter, such that a color image of one frame is displayed on the liquid crystal panel 1.

The backlight 2 is a light source for irradiating the liquid crystal panel 1 with light from the back side thereof. The backlight 2 is provided with optical sheets including a diffusion plate disposed on the front side thereof (on a side of the surface facing the liquid crystal panel 1) to uniformly diffuse the light from the backlight 2, and the light from the backlight 2 passes through the optical sheets to be made incident on the liquid crystal panel 1 as uniform flat light. Further, the backlight 2 is provided with a reflection sheet on the back side thereof (on the side of the surface facing the backlight chassis 5), so that the light from the backlight 2 is efficiently made incident on the liquid crystal panel 1. However, it is not necessary to provide the optical sheet between the backlight 2 and the liquid crystal panel 1, so long as the backlight 2 has a configuration capable of radiating uniform flat light.

Figure 5A:
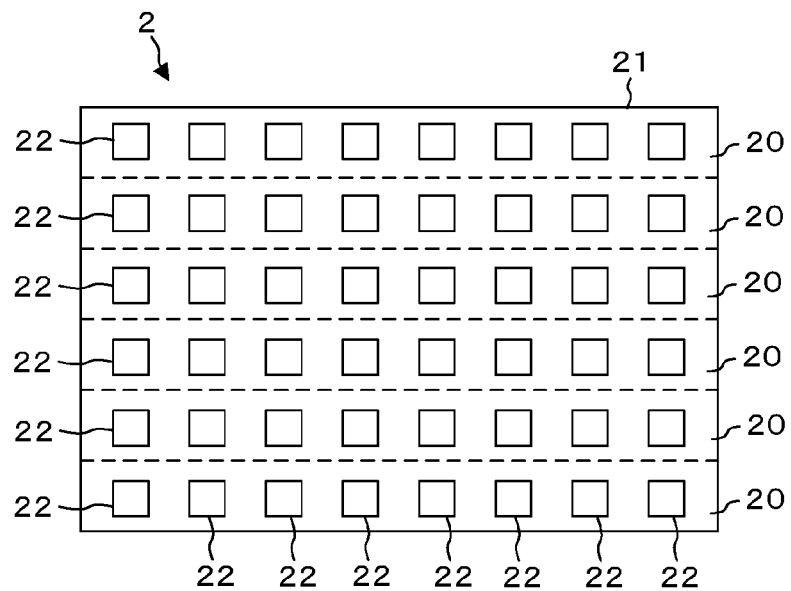
FIG. 5A is a schematic view illustrating a configuration of backlight.
Figure 5B:
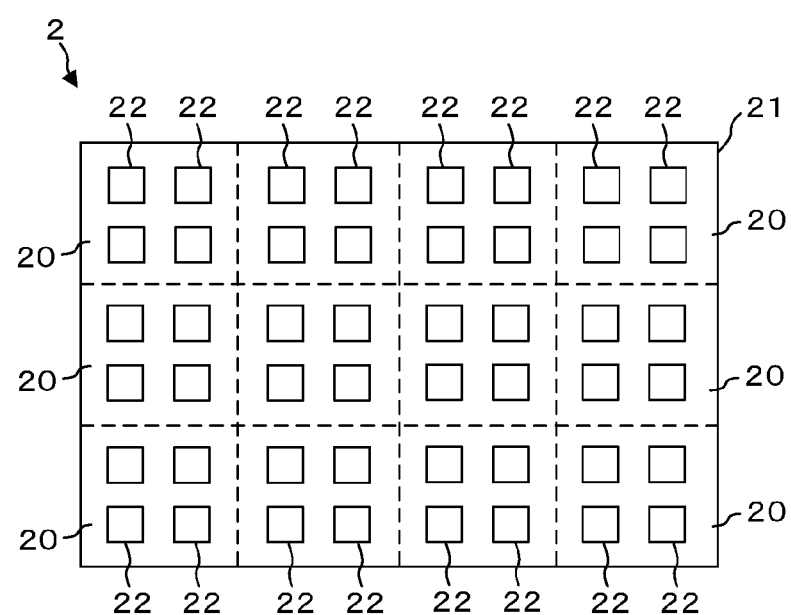
FIG. 5B is a schematic view illustrating a configuration of backlight.

FIGS. 5A and 5B are schematic views illustrating a configuration of the backlight 2. The backlight 2 has a rectangular plate-shaped substrate 21, and a plurality of light sources 22 mounted on one surface of the substrate 21. The light source 22 is, for example, a light emitting diode (LED) for emitting white light, and is mounted on the one surface of the substrate 21 in a two-dimensional matrix shape. Furthermore, the light source 22 may be, for example, a cold cathode fluorescent lamp (CCFL), an external electrode fluorescent lamp (EEFL), a hot cathode fluorescent lamp (HCFL) or the like. In these cases, a plurality of lamps are provided by being juxtaposed on the one surface of the substrate 21.

In the backlight 2 of the present embodiment, as illustrated by broken lines in FIGS. 5A and 5B, the mounting surface of the substrate 21, on which the light sources 22 are mounted, is divided into a plurality of areas 20, and the same number of light sources 22 as each other are provided in each area 20. In the example illustrated in FIG. 5A, the mounting surface is divided into six rectangular areas 20 in a vertical direction, and eight light sources 22 are provided in each area 20. In the example illustrated in FIG. 5B, the mounting surface is divided into a total of twelve areas 20 by dividing into four in the horizontal direction and dividing into three in the vertical direction, and four light sources 22 are provided in each area 20. The number of areas 20, and the number of light sources 22 provided in each area 20 are not limited to the examples illustrated in FIGS. 5A and 5B. The light sources 22 provided in each area 20 illuminate the display region of the liquid crystal panel 1 facing the respective areas 20 from the rear side.

The backlight 2 of the present embodiment controls the light emission (turn on), turn off and luminance (light emission rate) of the light sources 22 for each area 20 by the backlight driving unit 17.

The image display unit 15 determines the light emission rate (luminance) of the light sources 22 provided in each area 20 of the backlight 2, based on the image data (RGB data representing the gradation values of red, green and blue in each pixel) acquired from the signal processing unit 14. Further, the image display unit 15 determines the light emission rate of each area 20 (the light sources 22) depending on the gradation values (for example, an average gradation value) of red, green and blue of each pixel to be displayed in each display region of the liquid crystal panel 1 illuminated by each area 20 of the backlight 2. For example, when the light emission rate of each area 20 is controlled in four steps, the image display unit 15 determines whether the average gradation value of each pixel to be displayed in each display region of the liquid crystal panel 1 is any one of a first stage of 0 to 63, a second stage of 64 to 127, a third stage of 128 to 191, and a fourth stage of 192 to 255. Then, the image display unit 15 determines the light emission rate of the corresponding area 20 according to the determined results. For example, when it is the gradation value of the first stage, a first light emission rate (for example 25%) is determined, when it is the gradation value of the second stage, a second light emission rate (for example 50%) is determined, when it is the gradation value of the third stage, a third light emission rate (for example 75%) is determined, and when it is the gradation value of the fourth stage, a fourth light emission rate (100%) is determined. Furthermore, the light emission rate represents a percentage to a maximum current value that can be supplied to each light source 22 of the backlight 2 by the backlight driving unit 17, and when the light emission rate is 25%, the backlight driving unit 17 supplies a current of a current value of 25% of the maximum current value to the light source 22.

In addition, the image display unit 15 determines the transmittance of light in each liquid crystal molecule of the liquid crystal panel 1, based on the image data (RGB data) acquired from the signal processing unit 14 and the determined light emission rate of each area 20. Specifically, the image display unit 15 determines a voltage value applied to each pixel electrode through the TFTs, based on the gradation values of red, green and blue in each pixel included in the images to be displayed. Furthermore, depending on the voltage value applied to each pixel electrode, the transmittance in the corresponding liquid crystal molecules is controlled.

The image display unit 15 outputs the determined transmittance (voltage values applied to each pixel electrode) to the panel driving unit 16, and outputs the determined light emission rate to the backlight driving unit 17. The panel driving unit 16 controls the transmittance of each liquid crystal molecule by applying the voltage to each pixel electrode based on the transmittance acquired from the image display unit 15, and the backlight driving unit 17 controls the light emission of the light source 22 of each area 20 based on the light emission rate acquired from the image display unit 15. Therefore, the light radiated from each area 20 (the light sources 22) of the backlight 2 with the light emission rate based on the image data is transmitted through each liquid crystal molecule with the transmittance based on the image data to display a color image based on the image data.

Herein, in the present embodiment, the image display unit 15 determines whether the gradation value of the image to be displayed is the halftone within a prescribed range. Further, in a case of 256 gradations, the prescribed range may be, for example, 96 or more and 168 or less. Specifically, the image display unit 15 determines whether the gradation values (for example, the average gradation value) of red, green and blue of each pixel to be displayed in the display region of the liquid crystal panel 1 corresponding to the irradiation region of each area 20 of the backlight 2 is the halftone within the prescribed range. When it is determined to be the halftone within the prescribed range, the image display unit (a gradation changing unit, a luminance changing unit) 15 changes the transmittance of each liquid crystal molecule in the display region and the light emission rate of the corresponding area 20. For example, the image display unit 15 increases (rising) the gradation values (gradation values of red, green and blue) of the pixel to be displayed on the display region by 50%, respectively, and decreases (lowering) the light emission rate of the corresponding area 20 by 70%. Furthermore, the image display unit 15 may decrease (lowering) the gradation value of the pixel to be displayed on the display region by 50%, respectively, and increase (rising) the light emission rate of the corresponding area 20 by 30%. In addition, the image display unit 15 may switch, depending on each gradation value, between increasing and decreasing the gradation value and the light emission rate, and may change, depending on each gradation value, an amount of increase or decrease in the gradation value and an amount of increase or decrease in the light emission rate. By changing the gradation value of each pixel to be displayed on each display region, the image display unit 15 changes the transmittance of each liquid crystal molecule in the display region, outputs the transmittance (voltage values applied to each pixel electrode) of each liquid crystal molecule after the change to the panel driving unit 16, and outputs the light emission rate after the change to the backlight driving unit 17. Therefore, in the present embodiment, the transmittance of each liquid crystal molecule of the liquid crystal panel 1 is controlled so as not to be the transmittance depending on the gradation value of the prescribed halftone.

Figure 6:
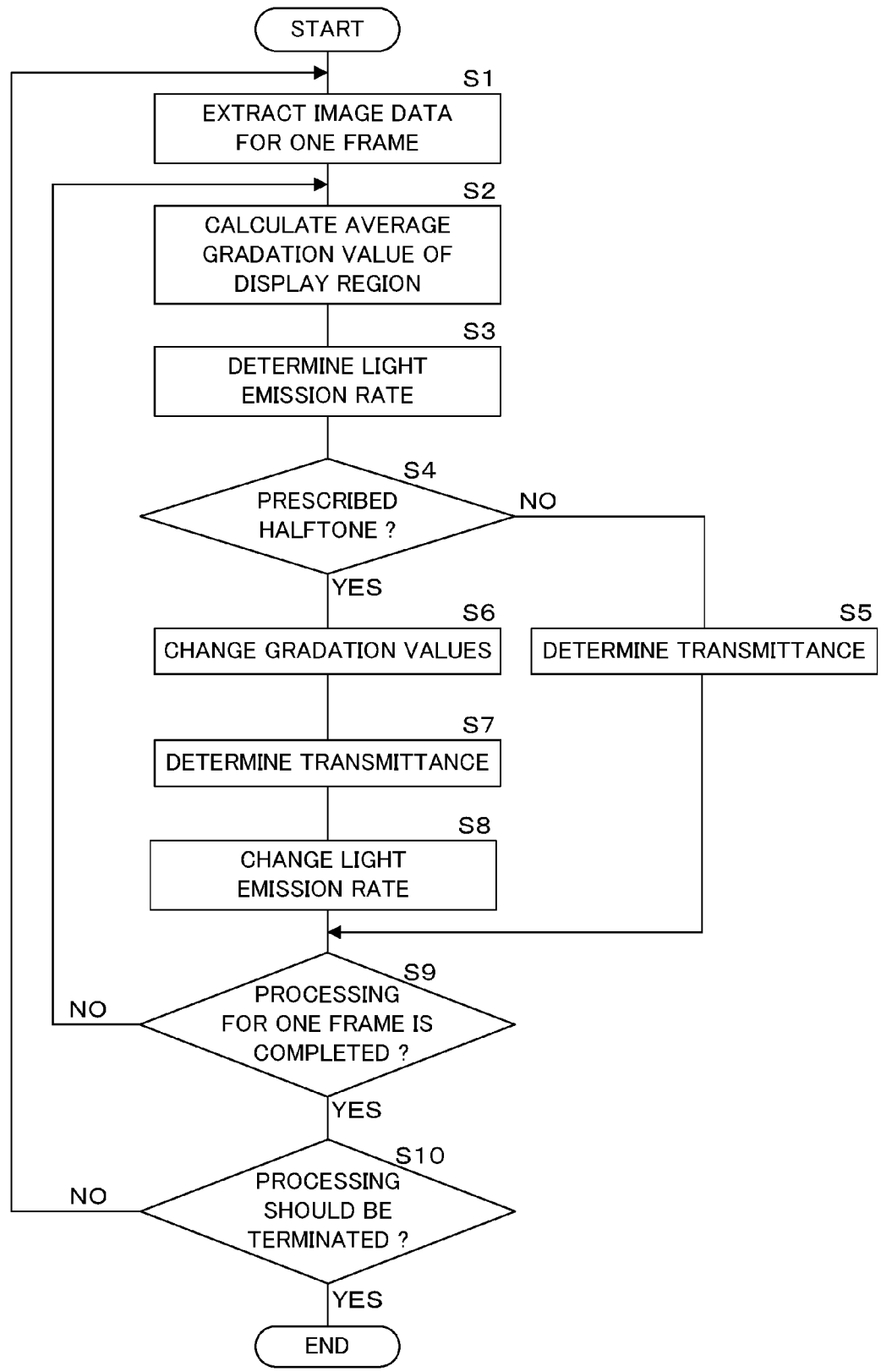
FIG. 6 is a flowchart illustrating a procedure of processing performed by the image display unit.

Next, in the liquid crystal television of the present embodiment, processing performed by the image display unit 15 will be described with reference to a flowchart. FIG. 6 is a flowchart illustrating a procedure of processing performed by the image display unit 15. In the liquid crystal television of the present embodiment, the image display unit 15 acquires the image data generated by the signal processing unit 14 based on the image signal input through the input signal switching unit 13. The image display unit 15 extracts image data for one frame from the image data sequentially acquired (S1). The image display unit 15 calculates, in the extracted image data for one frame, an average gradation value of an image to be displayed on any display region of the liquid crystal panel 1 (display region corresponding to the irradiation region of any area 20 of the backlight 2) (S2). For example, the image display unit 15 calculates an average value of the gradation values of red, green and blue of each pixel included in the image.

The image display unit 15 determines the light emission rate of the corresponding area 20 (the light sources 22) of the backlight 2, based on the calculated average gradation value (S3). Then, the image display unit 15 determines whether the average gradation value calculated in step S2 is the halftone within the prescribed range (S4). When it is determined not to be the halftone within the prescribed range (NO in S4), the image display unit 15 determines the transmittance (voltage values applied to each pixel electrode) of light in each liquid crystal molecule in the display region, based on the gradation values of red, green and blue of each pixel to be displayed in the display region (S5). Thereafter, the image display unit 15 proceeds the processing to step S9. Furthermore, the image display unit 15 stores the light emission rate of the area 20 determined in step S3 and the transmittance of each liquid crystal molecule determined in step S5 in a memory provided in the image display unit 15, a memory connected to the image display unit 15 or the like.

When it is determined to be the halftone within the prescribed range (YES in S4), the image display unit 15 changes the gradation values of red, green and blue of each pixel to be displayed in the display region (S6). The image display unit 15 determines the transmittance (voltage values applied to each pixel electrode) of each liquid crystal molecule in the display region, based on the gradation values of red, green and blue of each pixel after the change (S7). Further, the image display unit 15 changes the light emission rate determined in step S3 based on the increase or decrease in the gradation value changed in step S6 (S8). Herein, the image display unit 15 also stores the light emission rate of the area 20 changed in step S8 and the transmittance of each liquid crystal molecule determined in step S7 in the memory provided in the image display unit 15, the memory connected to the image display unit 15 or the like.

The image display unit 15 determines whether the processing of the image data for one frame extracted in step S1 is completed (S9), and when it is determined that the processing is not completed (NO in S9), returns the processing to the processing of step S2, then performs the processing of steps S2 to S8 on the other display regions of the liquid crystal panel 1. When it is determined that the processing of the image data for one frame is completed (YES in S9), the image display unit 15 determines whether the above-described processing should be terminated (S10). For example, when the end of the operation of the liquid crystal television is instructed by the user through the remote controller, the control unit 10 instructs the end of the operation to the image display unit 15, and the image display unit 15 determines that the processing should be terminated. When it is determined that the processing should not be terminated (NO in S10), the image display unit 15 returns the processing to the processing of step S1, and extracts image data for next one frame from the image data acquired from the signal processing unit 14 (S1). In addition, the image display unit 15 performs the processing of steps S2 to S9 on the extracted image data for one frame. When it is determined that the processing should be terminated (YES in S10), the image display unit 15 ends the above-described processing.

By the above-described processing, after determining the transmittance (voltage values applied to each pixel electrode) of each liquid crystal molecule of the liquid crystal panel 1 and the light emission rate of each area 20 (the light sources 22) of the backlight 2 for displaying an image of one frame, the image display unit 15 outputs the determined transmittance to the panel driving unit 16, and outputs the determined light emission rate to the backlight driving unit 17 at a prescribed timing. The panel driving unit 16 applies voltages to each pixel electrode of the liquid crystal panel 1 based on the acquired transmittance, and the backlight driving unit 17 controls each light source 22 to emit light with the acquired light emission rate, such that the image of one frame is displayed on the liquid crystal panel 1.

In the present embodiment, when the image to be displayed in each display region of the liquid crystal panel 1 is a prescribed halftone image, the transmittance of the liquid crystal molecules in the display region is increased or decreased, and the light emission rate of the corresponding area 20 is decreased or increased. That is, the liquid crystal molecules, which are originally to be controlled so as to have the transmittance depending on the gradation value of the prescribed halftone, are controlled so as to have the transmittance depending on a gradation value other than the prescribed halftone. Further, depending on the change in the transmittance, by changing the light emission rate (luminance) of the backlight 2, display of a desired halftone image is achieved. Specifically, when controlling the liquid crystal molecules so as to have the transmittance depending on a higher gradation value than the desired halftone, the light emission rate of the corresponding backlight 2 is decreased, such that the desired halftone is represented. Further, it is possible to configure in such a manner that, when controlling the liquid crystal molecules so as to have the transmittance depending on a lower gradation value than the desired halftone, the light emission rate of the corresponding backlight 2 is increased, such that the desired halftone may be represented. That is, in each liquid crystal molecule of the liquid crystal panel 1, the halftone is represented by a combination with the light emission rate of the backlight 2, without representing the halftone.

When viewing the displayed image of the halftone from an oblique direction, the luminance of the blue pixel visually recognized by the user is lower than the luminance of red pixel and green pixel, such that there is a problem that the displayed image of a yellowish color is viewed. In the present embodiment, since each liquid crystal molecule of the liquid crystal panel 1 is controlled so as to have the transmittance depending on the gradation value other than the prescribed halftone, it is possible to suppress a yellow coloring of the displayed image. Further, in the present embodiment, by controlling the transmittance of each liquid crystal molecule of the liquid crystal panel 1 and the light emission rate of each light source 22 of the backlight 2, coloring of the displayed image is suppressed. Thereby, since it is not necessary to change the specifications of the liquid crystal panel 1, and change the timing for driving the liquid crystal panel 1 and the backlight 2, the inventive apparatus is easily applicable to conventional liquid crystal televisions without increasing costs.

In the above-described embodiment, the backlight 2 is a direct type light source device, but the present invention is also applicable to a liquid crystal display apparatus including an edge light type light source device, so long as the light source 22 can be controlled for each area 20 of the backlight 2.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

It is noted that, as used herein and in the appended claims, the singular forms "a", "an", and "the" include plural referents unless the context clearly dictates otherwise.

The invention claimed is:
1. A liquid crystal display apparatus comprising:
a liquid crystal panel having a display region;
a light source device having a plurality of light emitting areas that irradiate toward the liquid crystal panel with light;
a light source control unit that controls luminance of the light irradiated from the light emitting areas for each light emitting area;
a gradation changing unit that determines, based on an image signal for displaying an image in the display region for each light emitting area, whether a gradation value of the image signal for a corresponding region in the display region corresponding to each light emitting area is within a prescribed range, and changes the gradation value of the image signal for the corresponding region to a gradation value other than the prescribed range when a result of the determination is affirmative; and
a panel driving unit that applies, to the liquid crystal panel, a voltage depending on the gradation value of the image signal, for the corresponding region corresponding to the light emitting area whose result of the determination is negative, and applies, to the liquid crystal panel, a voltage depending on the gradation value changed by the gradation changing unit, for the corresponding region corresponding to the light emitting area whose result of the determination is affirmative, among a plurality of corresponding regions in the display region corresponding to the plurality of light emitting areas, respectively,
wherein
the light source control unit controls the luminance of the light irradiated from the light emitting area whose result of the determination is negative so as to be a predetermined reference luminance, and controls the luminance of the light irradiated from the light emitting area whose result of the determination is affirmative so as to be a luminance changed from the reference luminance.

2. The liquid crystal display apparatus according to claim 1, wherein
the gradation changing unit changes the gradation value of the image signal for the corresponding region based on an amount of change depending on the gradation value, and
the light source control unit changes the luminance of the light irradiated from the light emitting area based on the amount of change depending on the gradation value.

3. The liquid crystal display apparatus according to claim 1, wherein the light source device directly irradiates one surface of the liquid crystal panel with light, or irradiates the same with light through a diffusion plate.

4. A television receiver comprising:
the liquid crystal display apparatus according to claim 1; and
a receiver that receives television broadcasts,
wherein the liquid crystal display apparatus displays an image based on the television broadcasts received by the receiver.

5. The liquid crystal display apparatus according to claim 1,
wherein the changed gradation value and the changed luminance are determined so that the image indicated by the image signal is displayed in the display region.

6. The liquid crystal display apparatus according to claim 1,
wherein the light source control unit controls the changed luminance so as to be smaller than the reference luminance when the gradation value changed by the gradation changing unit is larger than the prescribed range, and controls the changed luminance so as to be larger than the reference luminance when the gradation value changed by the gradation changing unit is smaller than the prescribed range, for the light emitting area whose result of the determination is affirmative.

7. The liquid crystal display apparatus according to claim 1,
wherein the gradation changing unit changes the gradation value of the image signal for the corresponding region when average value of the gradation values of the image signal for pixels included in the corresponding region is within the prescribed range.

8. The liquid crystal display apparatus according to claim 1, wherein
the display region comprises a plurality of pixels including red pixel for displaying red color, green pixel for displaying green color and blue pixel for displaying blue color, and
the prescribed range is a range of gradation value in which the luminance of the blue pixel is lower than the luminance of the red pixel and green pixel when viewing the display region from an oblique direction.

9. The liquid crystal display apparatus according to claim 1, wherein
the number of gradations of each color displayed in the display region is 256, and
the prescribed range is a range of gradation value of 96 or more and 168 or less.

10. The liquid crystal display apparatus according to claim 1,
wherein the light source control unit controls a light emission ratio of light source for the light emitting area so as to be a predetermined reference light emission ratio, for the light emitting area whose result of the determination is negative, and controls a light emission ratio of light source for the light emitting area so as to be a light emission ratio selected among one or more light emission ratios higher than the reference light emission ratio and one or more light emission ratios lower than the reference light emission ratio, for the light emitting area whose result of the determination is affirmative.

* * * * *